(12) United States Patent
Rhee

(10) Patent No.: US 8,172,297 B2
(45) Date of Patent: May 8, 2012

(54) MULTI-POSITION ROTARY DETENT ASSEMBLY

(75) Inventor: Que-Whang Rhee, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 753 days.

(21) Appl. No.: 12/244,055

(22) Filed: Oct. 2, 2008

(65) Prior Publication Data
US 2010/0083779 A1   Apr. 8, 2010

(51) Int. Cl.
*B60R 7/06* (2006.01)

(52) U.S. Cl. ............... 296/37.12; 296/37.8; 296/24.34; 296/70

(58) Field of Classification Search ............ 49/386; 296/24.34, 37.12, 37.8, 70
See application file for complete search history.

(56) References Cited

U.S. PATENT DOCUMENTS

| | | | |
|---|---|---|---|
| 4,595,228 A | 6/1986 | Chu | |
| 5,050,922 A * | 9/1991 | Falcoff | 296/37.7 |
| 5,413,317 A | 5/1995 | Spoerre | |
| 6,003,925 A * | 12/1999 | Litke et al. | 296/37.8 |
| 6,135,528 A | 10/2000 | Sobieski et al. | |
| 6,874,667 B2 | 4/2005 | Dykstra et al. | |
| 7,004,517 B2 * | 2/2006 | Vitry et al. | 292/213 |
| 7,500,704 B2 * | 3/2009 | Herrera et al. | 296/37.12 |
| 2004/0051333 A1 * | 3/2004 | Brown et al. | 296/37.12 |
| 2008/0265605 A1 * | 10/2008 | Biggs et al. | 296/37.8 |
| 2009/0302628 A1 * | 12/2009 | Cinco | 296/37.1 |

* cited by examiner

*Primary Examiner* — Jerry Redman
(74) *Attorney, Agent, or Firm* — Gifford, Krass, Sprinkle, Anderson & Citkowski, P.C.

(57) ABSTRACT

A multi-position rotary detent assembly operable to selectively retain a first component and a second component in a first position, a second position, and at least one intermediate position is provided. The detent assembly includes a first biasing assembly urging the first component into the first position. A cam plate is disposed opposite a guide pin assembly and has a cam path having a first detent feature and at least one intermediate detent feature. The guide pin is configured to engage the cam plate and is movable along the cam path. The first component is in the first position when the guide pin engages the first detent feature, is placed in an intermediate position when the guide pin engages a corresponding intermediate detent feature, and is urged into in the second position when disengaged from the cam path.

8 Claims, 7 Drawing Sheets

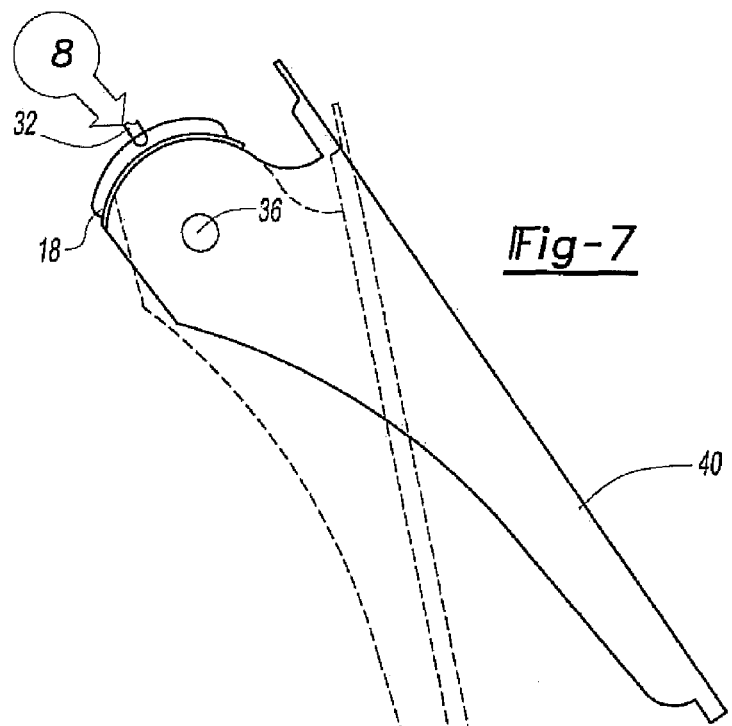
Fig-7
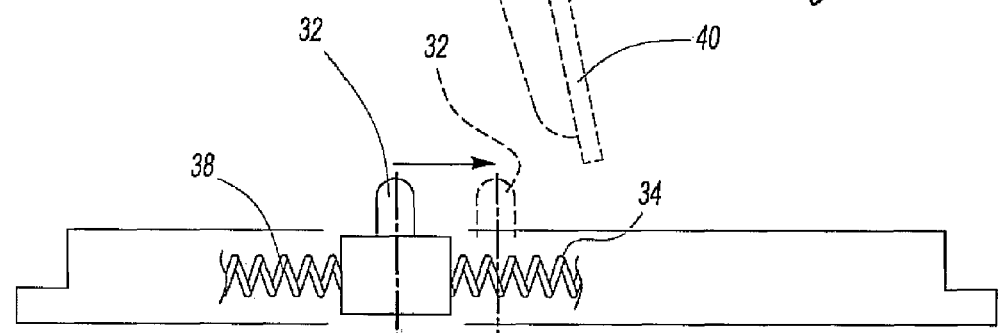
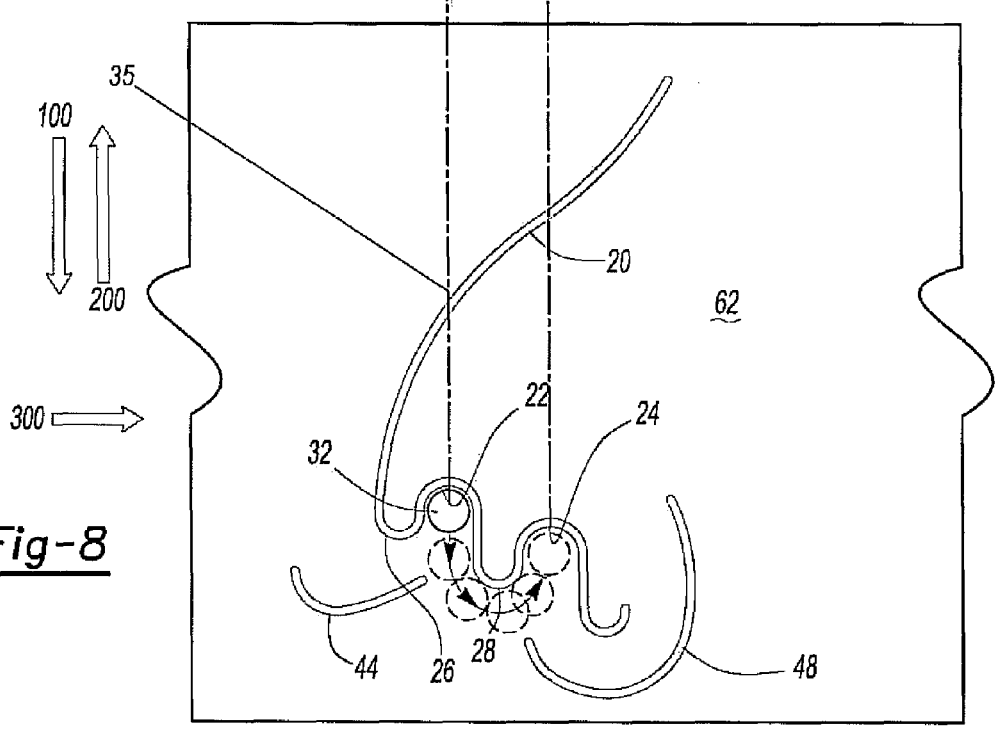
Fig-8

MULTI-POSITION ROTARY DETENT ASSEMBLY

FIELD OF THE INVENTION

This invention relates generally to a rotary detent assembly for positioning two components between a first position, a second position, and intermediate positions therebetween. For example, a door having the rotary detent assembly is movable from a closed position, to an open position, and intermediate positions therebetween.

BACKGROUND OF THE INVENTION

Many devices are configured so as to move one component relative to another. For instance, a pen may have a nib movable in and out of a case. Thus, the pen is readied for writing when the nib is fully extended from the case, and the nib is protected when housed within the case. However, it may be desirable to position the nib between the fully extended position and fully retracted position so as to make room for the positioning of other pen components within the case.

Doors may also be fitted with a device operable to move the door between different positions so as to convenience users. One such simple device is a standard hinge, while other devices may automatically move the door to predetermined positions. For instance, U.S. Pat. No. 5,845,954 to DePue discloses a glove box assembly having a guide track element for which a guide pin may engage. The guide track element has indentures which may hold the guide pin so as to position the glove box door in a fully closed, partially open, or fully open position. However, DePue does not teach a glove box assembly capable of moving a door from a closed position to an open position so as to bypass the partially open position.

Another device used to move the door from one position to another is commonly referred to as a push-push latch assembly. The push-push latch assembly generally allows a user to push the door to both open and close the door. Such assemblies are well known and documented. For instance, U.S. Pat. No. 6,247,733 to Weiland discloses a push-push latch assembly having a pin receivable by a shuttle. The shuttle has a path for which the pin may travel so as to position a door from a closed to an open position, and from an open position to a closed position by simply pushing on the door. The pin is urged about the path of the shuttle by a biasing spring and a pivotable prong. However, Weiland does not teach a push-push latch assembly operable to position a door into an intermediate position between the open and closed positions.

Having a storage compartment with a door movable from a closed position to an open position, and intermediate positions therebetween is desirable. A storage compartment with such a feature is particularly useful in an automotive vehicle as it provides the users with the convenience of fittingly storing small hand-held devices such as an MP3 player, wallet, or cellular phone. Having a door that presents a partially open position so as to fittingly hold such devices may help prevent these devices from being otherwise scratched and damaged by being jostled within a larger compartment as the vehicle is being operated. In other instances the user may want to fully access the storage compartment and position the door from an intermediate position to a fully open position, or the user may not want to spend the time and effort moving the door through the intermediate positions to get to the fully open position.

Accordingly, it is desirable to have an assembly operable to move a component such as a door between a closed position to an open position, and intermediate positions therebetween by simply pushing against the door, wherein the intermediate positions may be bypassed by simply pushing against the door as well.

SUMMARY OF THE INVENTION

A multi-position rotary detent assembly operable to selectively retain a first component and a second component in a first position, a second position, and at least one intermediate position relative to one another is provided. In one embodiment, the first component is a door and the second component is a door frame. Accordingly, the multi-position rotary detent assembly is operable to selectively retain the door in an open position, a closed position, and at least one partially open position relative to the door frame. The multi-position rotary detent assembly includes a first biasing assembly, a cam plate, and a guide pin assembly. The first biasing assembly hingedly connects the door to the door frame so as to continually urge the door into the open position. The cam plate is disposed on either the door or the door frame, and has a cam path rib defining a cam path having defined thereupon, a first detent feature and at least one intermediate detent feature. The guide pin assembly is disposed on the other of either the door or the door frame and includes a guide pin operable by a guide pin biasing assembly.

The guide pin is configured to engage the cam plate so as to be movable along the cam path. Specifically, the guide pin biasing assembly urges the guide pin from a first pin position to a neutral position while the first biasing assembly urges the door to the open position. Thus the guide pin biasing assembly and the first biasing assembly work in concert to maintain the guide pin along the cam path. As the guide pin is engage within the first detent feature, the door is in a closed position, when the guide pin is engage in any of the intermediate detent features, the door is placed in a corresponding intermediate position, and when the guide pin is disengage from the cam plate, the first biasing assembly is free to urge the door into the fully open position.

The cam plate and guide pin assembly are configured and disposed so that in the operation of the rotary detent assembly, the first biasing assembly and guide pin assembly work in concert to move the guide pin in one direction along a predetermined length of the cam path so as to sequentially engage the first detent feature, and each of the at least one intermediate detent feature. When the door is in the closed position, the guide pin is engaged with the first detent feature. Specifically, the guide pin is positioned in the first pin position and thus is biased by the guide pin biasing assembly towards the neutral position, while simultaneously the first biasing assembly is urging the guide pin against the first detent feature. When the door is pushed with a predetermined force, the guide pin is moved from the first pin position towards the neutral position, and the first biasing assembly urges the door to the open position, thus the guide pin is urged along the cam path into an intermediate detent feature so as to place the door in an intermediate position. In this manner the guide pin may be sequentially placed within each of the intermediate detent feature so as to position the door into corresponding intermediate positions relative to either the closed or open positions. When the door, in the last of the intermediate detent features, is pushed inwardly with a predetermined amount of force, the first biasing means disengages the guide pin from the cam plate so as to move the guide pin to the neutral position and place the door in the open position.

The cam plate may optionally include a guide rib adjacent the first detent feature so as to help guide the guide pin into the first detent feature. The guide rib defines a first path of travel leading towards the first detent feature. Accordingly, the guide rib, the first biasing assembly and the guide pin assembly work in concert with each other so as to guide the guide pin into the first detent feature in the event that the guide pin is forced into contact with the guide rib.

The cam plate may also optionally include a bypass rib adjacent the at least one intermediate detent features. The bypass rib defines a second path of travel over each of the intermediate detent features. The bypass rib, the first biasing assembly, and the guide pin assembly work in concert to guide the guide pin past each of the at least one intermediate detent features when the first component is moved relative to the second component in a predetermined manner so as to place the bypass rib between the guide pin and the cam path. Accordingly, the bypass rib, the first biasing assembly, and guide pin assembly urges the guide pin along the second path of travel to a predetermined location whereupon the guide pin is disengaged from the cam plate so as to allow the first biasing assembly to freely urge the door into the open position.

BRIEF DESCRIPTION OF THE DRAWINGS

FIG. 7 is a side view of the door in the closed position and an intermediate position, the door is moved from the closed position to the intermediate position by having a user push the door towards the storage compartment;

FIG. 8 shows the movement of the guide pin along the cam path from the first detent feature into the intermediate detent feature shown in FIG. 7, the guide pin is moved so by the user pushing down on the door and the torsion spring and biasing assembly working in concert to urge the guide pin into the intermediate detent when the guide pin is moved past the second lobe;

DETAILED DESCRIPTION OF THE INVENTION

Figure 1:
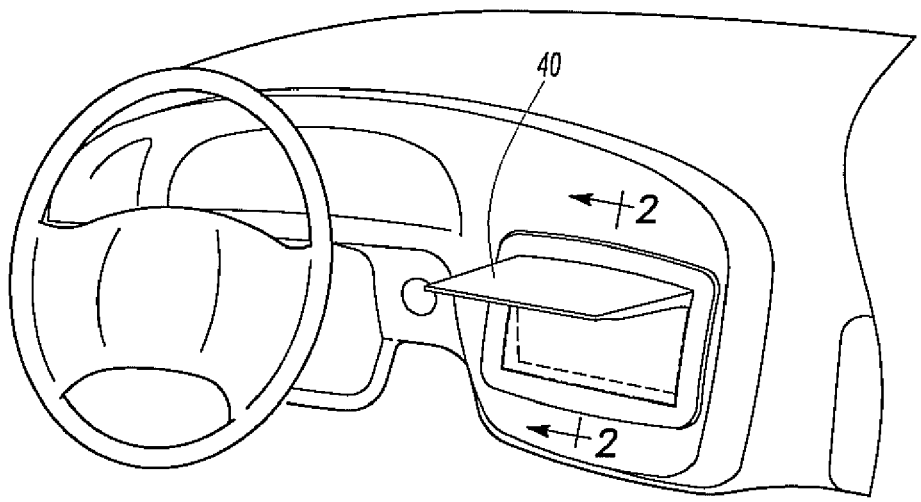
FIG. 1 is a view of a storage compartment of an automobile having a door operable by the multi-position rotary detent assembly to present a fully open position, fully closed position, and an intermediate position.
Figure 2:
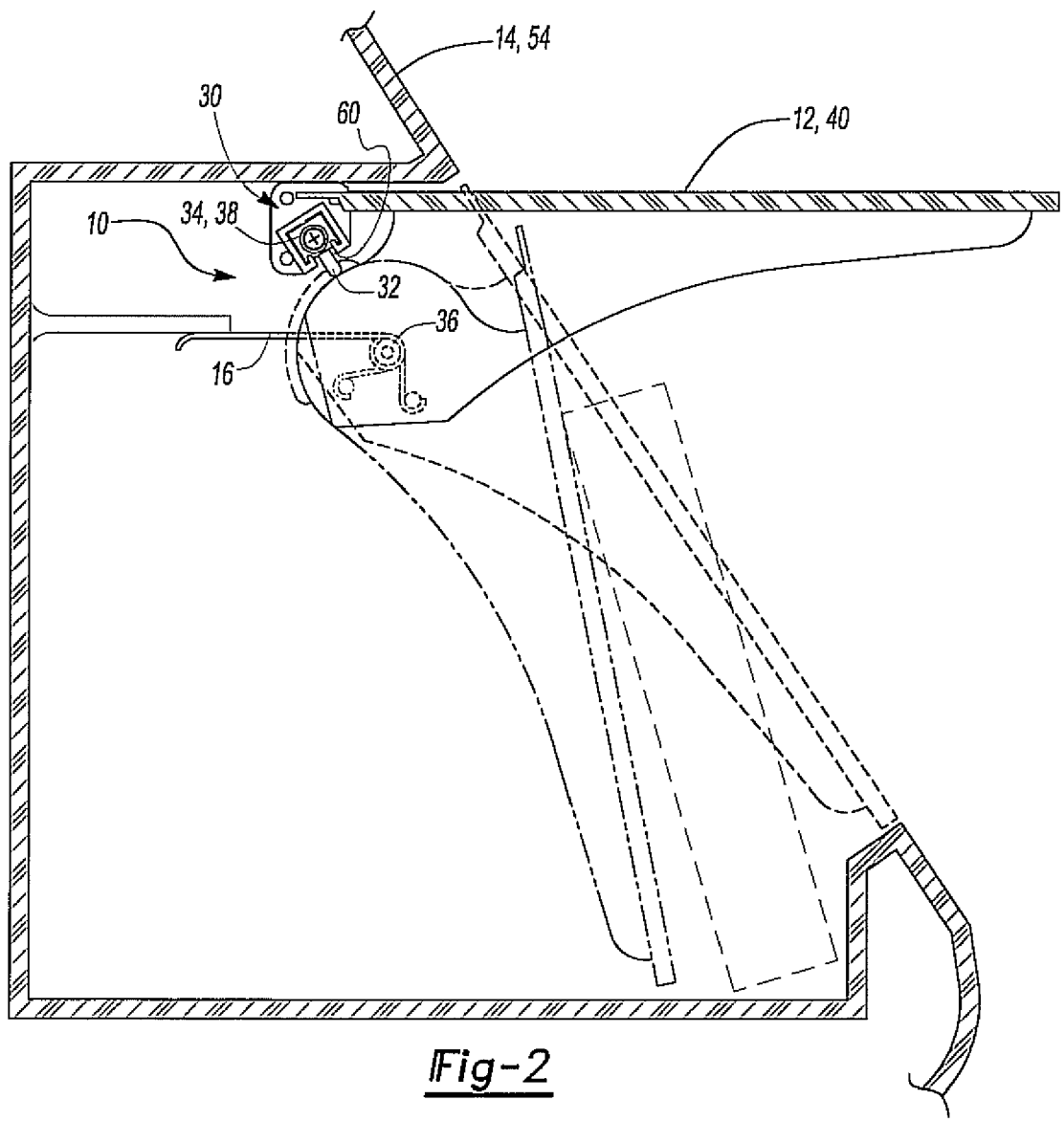
FIG. 2 is a cross sectional view of FIG. 1, showing the position of the guide pin relative to the cam plate as the door is positioned in a fully open, closed and intermediate position, as seen, in the intermediate position, a hand-held device may be fittingly seated within a partitioned portion of the storage compartment defined by the door, whereas when the door is fully opened, the storage compartment is fully accessible.

Referring to the Figures, wherein like numerals indicate corresponding parts throughout the several views, a multi-position rotary detent assembly 10 operable to selectively retain a first component 12 and a second component 14 in a first position, a second position, and at least one intermediate position relative to one another is provided. The multi-position rotary detent assembly 10 includes a first biasing assembly 16 for biasing the first component 12 and the second component 14 between the first and second positions. A cam plate 18 is disposed on the first component 12, and includes a cam path rib 20 that defines a cam path 20. The cam path 20 has defined thereupon, a first detent feature 22 and at least one intermediate detent feature 24. Naturally, the cam path rib 20 must also include lobes 26, 28 extending away from the detent features 22, 24 so as to form the detent features 22, 24. Specifically the cam path rib 20 includes a first lobe 26 and at least one intermediate lobe 28 thus forming the first detent feature 22 and a desired plurality of intermediate detent features 24.

A guide pin assembly 30 including a guide pin 32 is disposed on the second component 14 and is configured to engage the cam plate 18 so as to be movable along the cam path 20. Specifically, the guide pin assembly 30 includes a guide pin biasing assembly 34 for urging the guide pin 32 from a first pin position 35 to a neutral position 37. The guide pin biasing assembly 34 and the first biasing assembly 16 urge the guide pin 32 along the cam path 20 as will be later explained in greater detail.

The cam plate 18 and guide pin assembly 30 are configured and disposed relative one another so that in the operation of the rotary detent assembly, the first biasing assembly 16 and guide pin assembly 30 work in concert to move the guide pin 32 in one direction along a predetermined length of the cam path 20 so as to sequentially engage the first detent feature 22, and each of the intermediate detent features 24.

In operation, the first biasing assembly 16 continually urges one of either the first or second components 12, 14 away from the other. For illustrative purposes, assume that the cam plate is fixed to the first component, and the guide pin assembly is fixed to the second component. As stated above, the cam path rib 20 is defined by a series of lobes 26, 28 interconnected by detent features 22, 24 and is positioned relative to the guide pin assembly 30 such that when the guide pin 32 is in contact with the cam plate 18, the guide pin 32 is urged away from the neutral position 37. Accordingly, when the guide pin 32 is engaged in the first detent feature 22, the guide pin 32 is in the first pin position 35 and by operation of the guide pin biasing assembly 34 and first biasing assembly 16 is urged against the first detent feature 22. The first detent feature 22 prevents the first biasing assembly 16 from urging the guide pin 32 further past the first detent feature 22 thereby fixing the first component 12 in a closed position.

Figure 3:
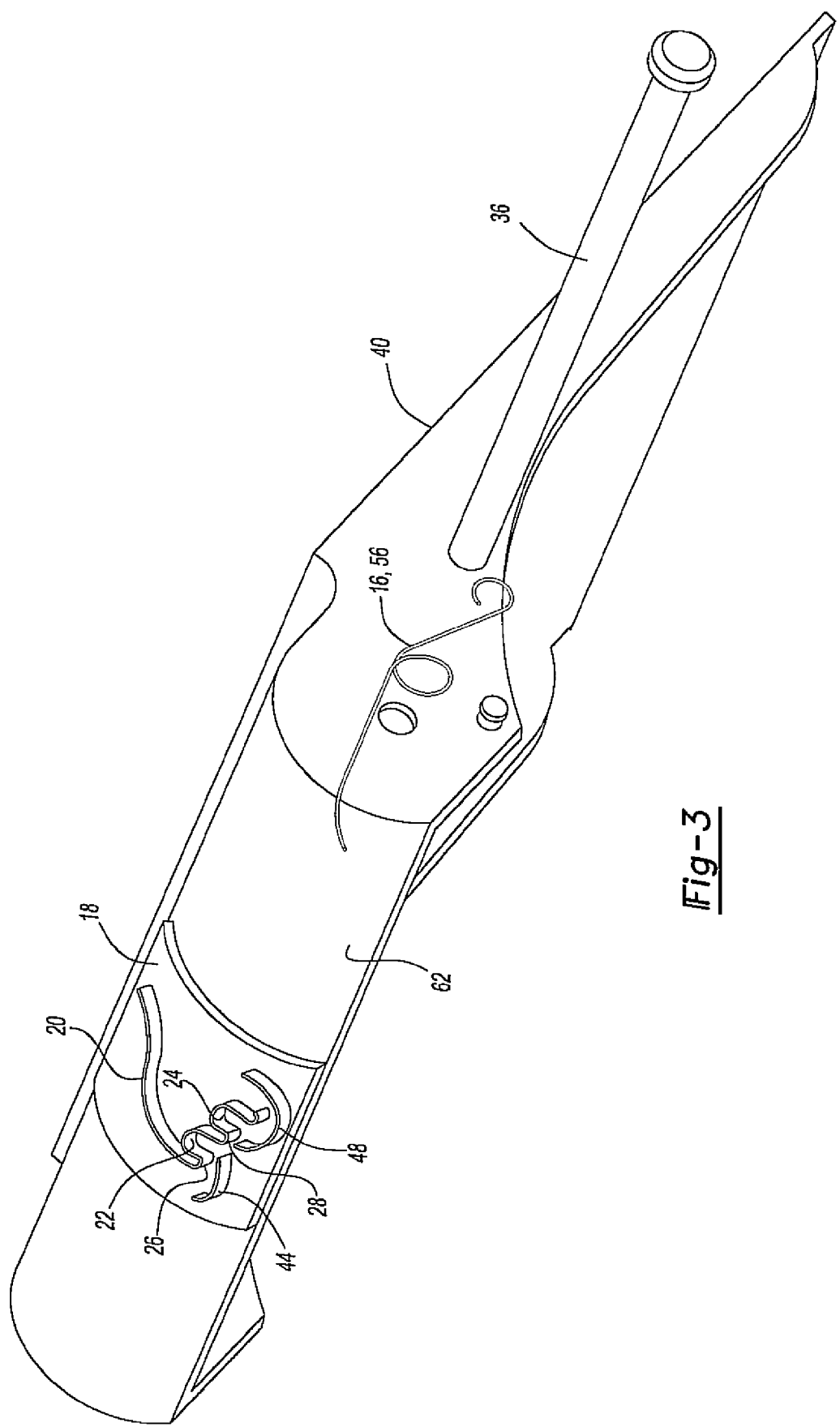
FIG. 3 is an exploded view of the door of FIG. 2, showing the cam plate, pin and torsion spring, with reference back to FIG. 2, it is understood that the torsion spring continually urges the door into the fully opened position by having one end of the torsion spring fixed to an arm on the door and the other end of the torsion spring engaged with a wall of the storage compartment.
Figure 4:
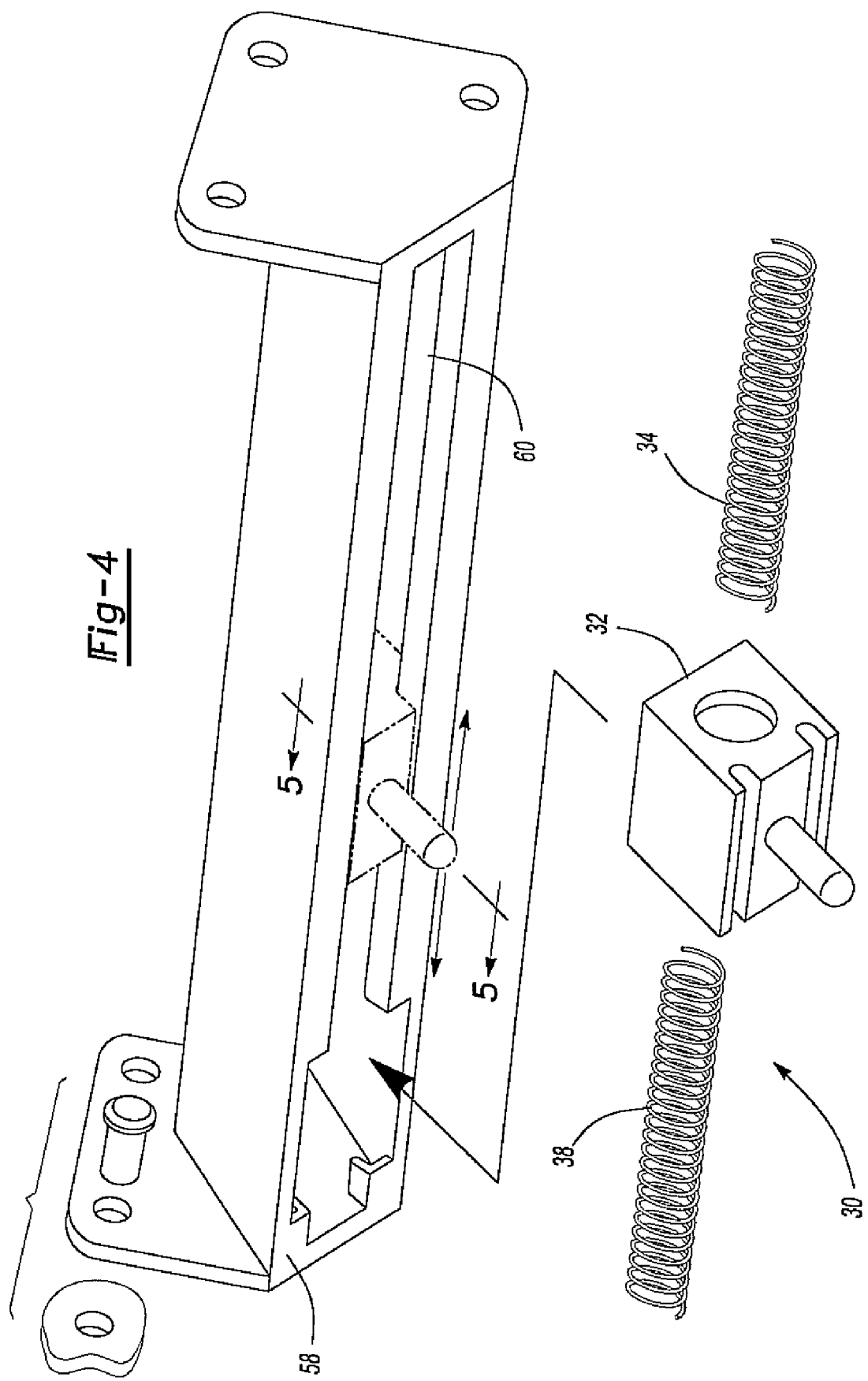
FIG. 4 is an exploded view of the guide pin assembly of FIG. 2, the guide pin assembly is fixedly secured to the door frame generally opposite of the cam plate, and the guide pin is held in a neutral position by two opposing springs, and is movable along the slot.
Figure 5:
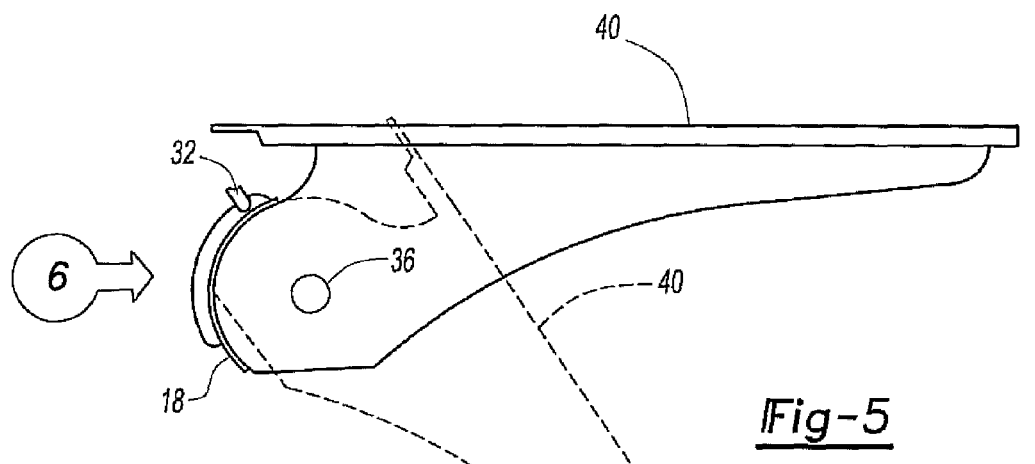
FIG. 5 is a side view of the door in the open and closed position, as will be explained in greater detail below, the door is moved from the open position to the closed position by having a user simply push down onto the door with a predetermined force.
Figure 6:
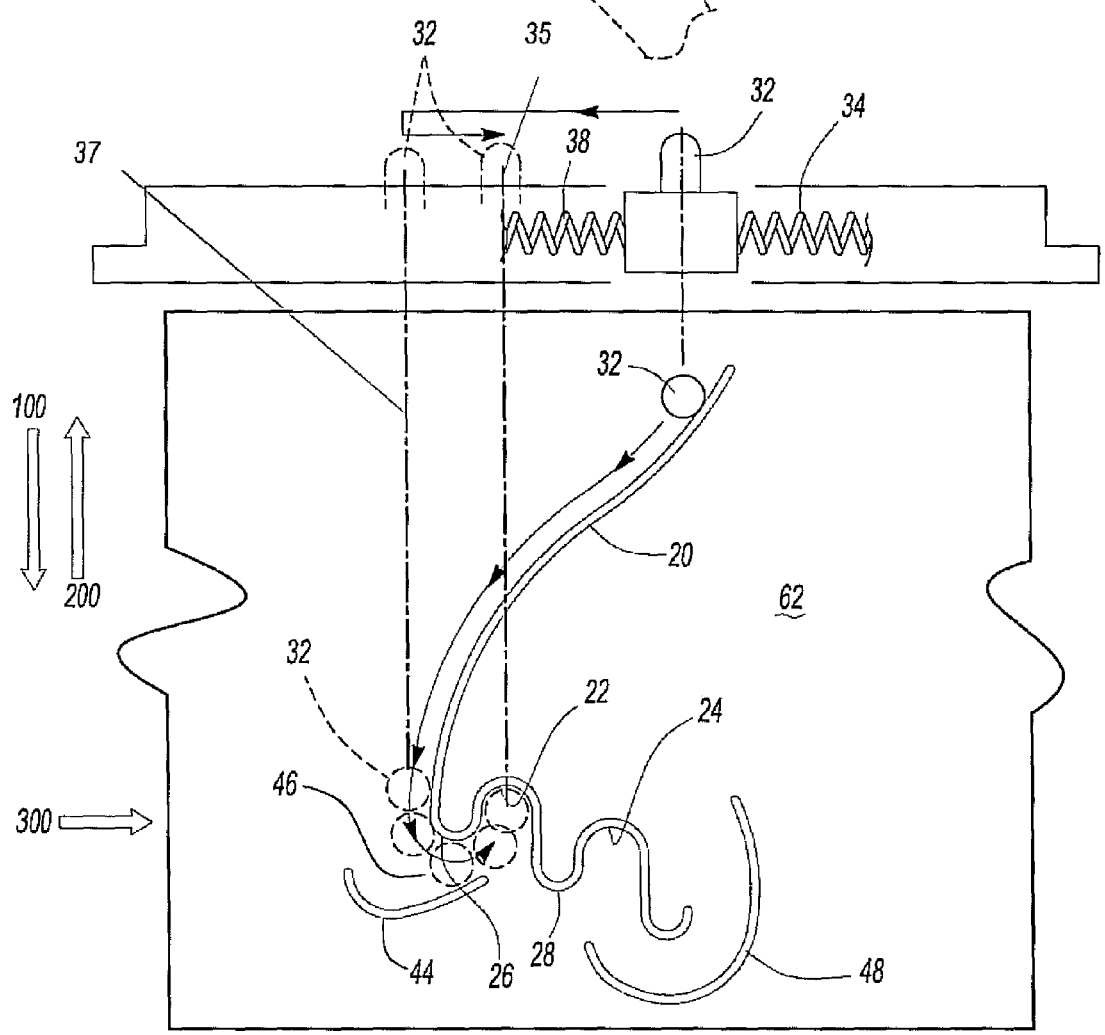
FIG. 6 shows the movement of the guide pin along the cam path rib so as to travel along the cam path, the downward push of the door causes the door to rotate about the pin, which in turn causes the guide pin to travel along the cam path, as the guide pin travels along the cam path, the guide pin overcomes the biasing forces of the guide pin biasing assembly so as to urge the guide pin out of the neutral position, thus as the guide pin travels past the first lobe, the guide pin assembly urges the guide pin back to the neutral position, and the torsion spring urges the door into the open position so as to place the guide pin in the first detent feature, as shown, the guide rib is positioned on the cam plate so as redirect the guide pin into the first detent assembly.

Upon a predetermined force applied to the first component 12 to push the first component 12 towards the second component 14, the predetermined force overcomes the biasing force of the first biasing assembly 16 thereby moving the guide pin 32 away from the cam path rib 20 where, upon the termination of the predetermined force, the guide pin biasing assembly 34 urges the guide pin 32 towards the neutral position 37, thus placing the guide pin 32 in first of the intermediate detent features 24 which in turn places the first component 12 in an intermediate position relative to the second component 14. This operation is repeated along the cam path 20 until the guide pin 32 is seated in the last of the intermediate detent features 24. Thus, in order to achieve this result, the detent features 22, 24 are arranged in a progressive manner such that each detent feature positions the door 40 in a more open position with respect to the previous detent feature. With reference now to FIG. 3, the cam path rib is shown. The first detent feature 22 is lower than the following intermediate detent feature 24 such that the cam path 20 rib is generally ramped shaped, thus making the guide pin 32 climb as it moves along the cam path 20.

When a predetermined force is then applied to the first component 12, the guide pin 32 is moved past the last intermediate detent feature 24 and over the last of the intermediate lobes 28 to a predetermined position 42 along the cam path 20 where the guide pin 32 is then disengaged from the cam plate 18. As the first biasing assembly 16 is no longer stopped by having the guide pin 32 held within a detent feature, the first component 12 is freely urged by the first biasing assembly 16 to move away from the second component.

The cam plate 18 may also include a guide rib 44 adjacent the first detent feature 22. The guide rib 44 defines a first path of travel 46 leading towards the first detent feature 22 so as to direct the movement of the guide pin 32 into the first detent feature 22. The movement of the first component relative to the second component will move the guide pin along the path of travel and into the first detent feature as described above. If the user pushes the first component 12 with too much force so as to overcome the biasing force of the first biasing assembly 16 and the guide pin biasing assembly 34, the guide pin 32 will move past the first detent and into one of the intermediate detent thus bypassing the first position and placing the first component 12 into one of the intermediate positions. The guide rib 44 is disposed above the first detent so as to catch the guide pin 32 and prevent such an occurrence. Thus, when the first component 12 experiences such a push, the guide pin 32 will abut against the guide rib 44 so as to allow the first biasing assembly 16 and the guide pin biasing assembly 34 to place the guide pin 32 into the first detent feature 22 and the first and second component in the first position.

The cam plate 18 may further include a bypass rib 48 adjacent the at least one intermediate detent features 24. The bypass rib 48 defines a second path of travel 50 over each of the intermediate detent features 24 so as to allow a user to move directly from the first detent feature to the beginning of the cam path. The bypass rib 48, the first biasing assembly 16, and the guide pin assembly 30 work in concert with each other to bypass each of the at least one intermediate detent features 24 when the first component 12 is moved relative to the second component 14 in a predetermined manner. Specifically, when the user pushes the first component 12 with enough force, the guide pin 32 will be positioned along the cam plate 18 so as to place the bypass rib 48 between the guide pin 32 and the intermediate detent features 24. Thus, the first biasing assembly 16 and the guide pin biasing assembly 34 will urge the guide pin 32 against the bypass rib 48 and along the second path of travel 50 over the intermediate detent features 24. The guide pin assembly 30 and the first biasing assembly 16 will eventually place the guide pin 32 in a predetermined location 52 along the bypass rib 48 whereupon the guide pin 32 will disengage from the can plate 18 as the first biasing assembly 16 urges the first component 12 into the second position.

With reference now to FIGS. 2-6, in a second preferred embodiment, the first or second component 12, 14 is a door 40 and the other of the first and second components 12, 14 is a door frame 54. For illustrative purposes only, the first component 12 will be the door 40 and the second component 14 will be the door frame 54. The door 40 is pivotably connected to the door frame 54, and the first biasing assembly 16 is shown as a torsion spring 56, cooperating with a pin so as to urge the door 40 away from the door frame 54. Thus, the first biasing assembly 16 is continually urging the guide pin 32 against the cam path 20 rib in the direction as shown by arrow 100. As the user pushes the door 40 towards the door frame 54, the guide pin 32 will be urged in a direction opposite arrow 100 as indicated by arrow 200.

In the second preferred embodiment, the guide pin assembly 30 further includes a housing 58, and a spring 38. The housing 58 includes a slot 60 for which a portion of the guide pin 32 may extend through, and the spring 38 interconnects the guide pin 32 to opposite sides of the housing 58 so as to place the guide pin 32 in a neutral position 37. When the guide pin 32 is in contact with the cam path rib 20, the guide pin biasing assembly 34 is continuously urging the guide pin 32 in a direction as indicated by arrow 300. Thus, in the second preferred embodiment, the multi-position rotary detent assembly 10 is operable to selectively retain a door 40 in an open position, a closed position, and at least one partially open position relative to the door frame 54.

The door 40 includes a ledge 62, and the cam plate 18 is shown disposed on the ledge 62 and the guide pin assembly 30 is disposed generally opposite the door 40 on the door frame 54. The cam plate 18 is fixedly attached to the ledge 62 by a screw, but it is anticipated that other commonly known methods of attaching the cam plate 18 may be used, such as vibration welding, an adhesive, a nail, or the like. The cam plate 18 may be made of a material sufficient to withstand the pushing forces of the user, such as a polymer or a metal. The door 40 is pivotably mounted to the door frame 54 by a pin 36 extending between opposite sides of the door frame 54 and through the length of the ledge 62 and the body of the torsion spring 56.

An explanation of the operation of second preferred embodiment will begin by having the door 40 in the closed position, thereby placing the guide pin 32 at the beginning of the cam path 20 as indicated by arrow 32. As the user pushes the door 40, the door 40 is pivoted towards the door frame 54, which in turn causes the guide pin 32 to engage the cam path rib 20. The push also causes the guide pin 32 to move along the cam path rib 20 along the direction as indicated by arrow 200. As the guide pin 32 travels the cam path 20, the guide pin biasing assembly 34 is urged past the neutral point, thus loading the guide pin 32. The guide pin 32 is eventually pushed past the first lobe 26, and the guide pin biasing assembly 34 urges the guide pin 32 along the direction of arrow 300 while the first biasing assembly 16 urges the guide pin 32 along the direction of arrow 100 thereby moving the guide pin 32 along the first path of travel 46 and into the first detent feature 22 placing the door 40 in the closed position. In the event that too much force is used to push the door 40, the guide pin 32 will abut against the guide rib 44. Upon release of the pushing force, the guide rib 44, first biasing assembly 16, and guide pin biasing assembly 34 will work in concert to direct the guide pin 32 into the first detent feature 22.

With reference now to FIGS. 7 and 8, the guide pin 32 is urged against and held within the first detent feature 22 by the first biasing assembly 16 and the guide pin biasing assembly 34. When the user pushes on the door 40 with a predetermined amount of force, the guide pin 32 is urged relative to the cam plate 18 in the direction of arrow 200. Thus when the guide pin 32 is moved past the first intermediate lobe 28, the first biasing means and the guide pin 32 biasing means urge the guide pin 32 in the directions of arrow 100 and 300 respectively, thereby placing the guide pin 32 into an intermediate detent feature 24. The intermediate detent prevents the first biasing spring 38 from urging the door 40 into a fully open position, and thus places the door 40 in a partially open position. This cycle of operation continues until the guide pin 32 is positioned into the last intermediate detent feature 24.

Figure 9:
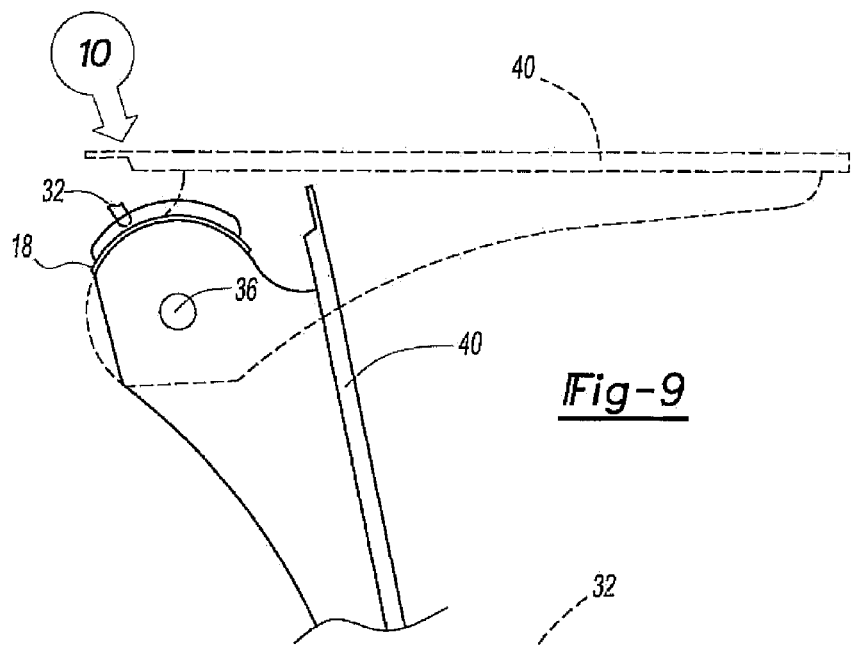
FIG. 9 is a side view of the door in the intermediate and open position, the door is moved from the closed position to the intermediate position by having a user push the door towards the storage compartment.
Figure 10:
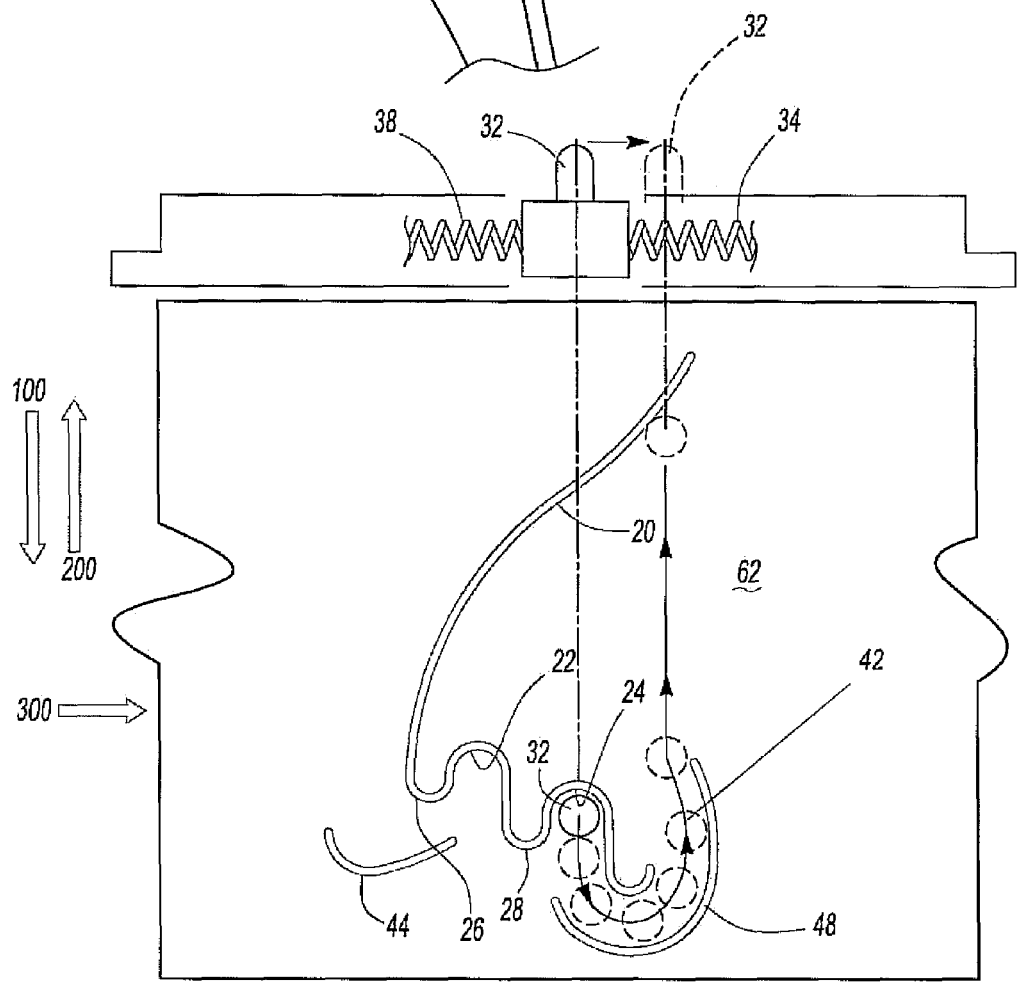
FIG. 10 shows the movement of the guide pin along the cam path from the intermediate detent feature back to the starting point of the cam path, as the door is pushed towards the storage compartment, the door is rotated about the pin, and a guide pin becomes disengaged from the cam plate, upon the termination of the pushing force, the torsion spring urges the door towards the open position while at the same time, the guide pin biasing assembly urges the guide pin into the neutral position, thus as the door is moved to the open position, the cam plate re-engages the guide pin at the start of the cam path.

With reference now to FIGS. 9 and 10, the guide pin 32 is in the last intermediate detent feature 24. A subsequent push by the user causes the guide pin 32 to move along the direction as indicated by arrow 200 and the guide pin biasing assembly 34 moves the guide pin 32 in the direction as indicated by arrow 300 until the guide pin 32 moves past the last intermediate lobe 28. Thus the guide pin 32 is no longer restrained by a detent feature and the first biasing assembly 16 is free to urge the door 40 into a fully opened position. As the door 40 pivots away from the door frame 54, the guide pin 32 is disengaged from the cam plate 18 and thus returns to the neutral position.

Figure 11:
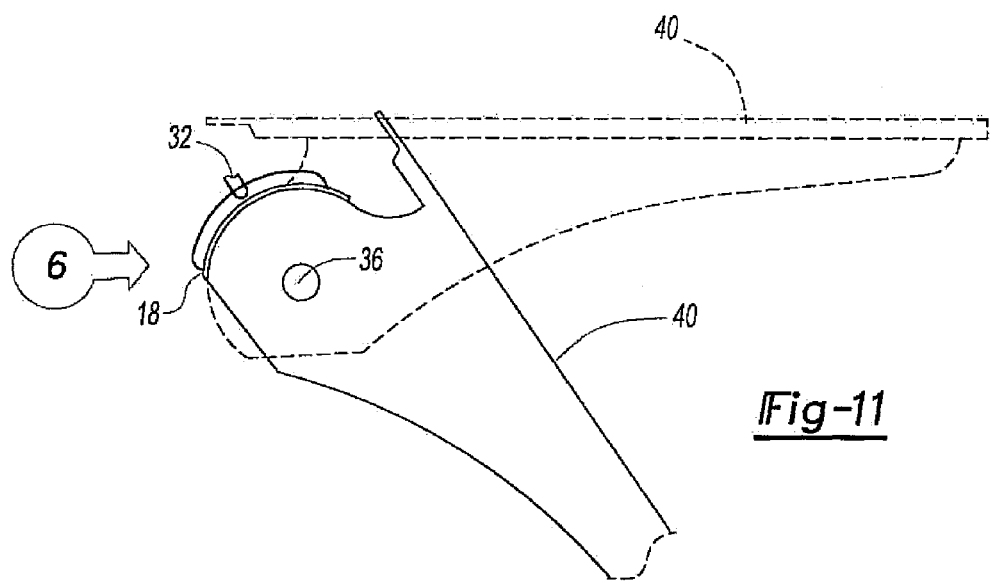
FIG. 11 is a side view of the door in the closed position and the open position, the door is moved from the closed position directly to the open position when the user exerts a predetermined pushing force against the door, as will be explained in greater detail below.
Figure 12:
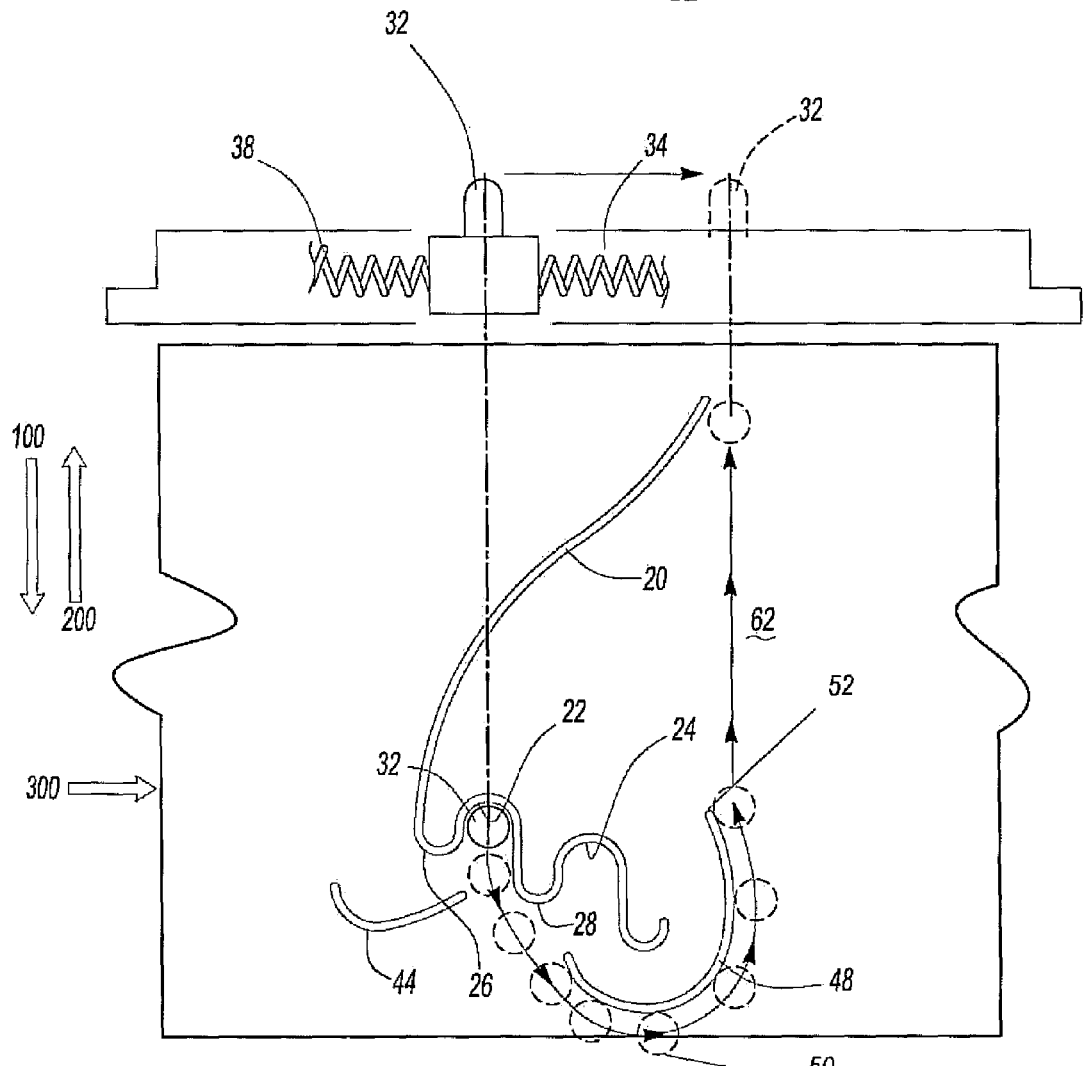
FIG. 12 shows the movement of the guide pin along the second path of travel wherein the guide pin is positioned so as to engage the bypass rib and move along the second path of travel, this occurs when the user exerts a pushing force that the guide pin biasing assembly and torsion spring cannot overcome, thus placing the guide pin onto the bypass rib, wherein upon release of the pushing force, the torsion spring and guide pin biasing assembly work in concert to urge the guide pin along the second path of travel and back to the starting point of the cam path.

As stated above, the door 40 may then be either successively moved through each of the intermediate positions or bypass the intermediate positions entirely. With reference now to FIGS. 11 and 12, the bypass rib 48 is shown disposed above each of the intermediate detent features 24. Thus upon a predetermined pushing force, the guide pin 32 will be moved from the first detent feature 22 and past the bypass rib 48 along the direction indicated by arrow 200. The first biasing assembly 16 and the guide pin biasing assembly 34 will then move the guide pin 32 along the directions indicated by arrow 100 and 300 respectively so as to place the guide pin 32 in contact with the bypass rib 48 and move the guide pin 32 along the second path of travel 50. As the guide pin 32 is no longer restricted by any intermediate detent features 24, the guide pin 32 will move along the second path of travel 50 until the first biasing assembly 16 urges the door 40 away from the door frame 54 so as to move the guide pin 32 to a predetermined position 42 along the cam path 20 whereby the guide pin 32 is then disengaged from the cam path rib 20 as the first biasing assembly 16 pivots the door 40 away from the door frame 54. Thus, when the door 40 is moved relative to the door frame 54 in this predetermined manner, the door 40 is moved from the closed position directly to the open position.

Thus the multi-position rotary detent assembly 10 may be used to move two different components 12, 14 relative to one another. For example, the multi-position rotary detent assembly 10 may be used to move an ink cartridge relative to pen case. Thus when the guide pin 32 is within the first detent feature 22, the ink cartridge is housed wholly within pen case, and is movable from that position to an intermediate position or directly to a fully extended position by pressing down on a button.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A multi-position rotary detent assembly operable to selectively retain a first component and a second component in a first position, a second position, and at least one intermediate position relative to one another, the multi-position rotary detent assembly comprising:

a first biasing assembly for biasing the first component and the second component between the first and second positions;

a cam plate disposed on the first component, the cam plate having a cam path rib defining a cam path, the cam path rib having a first detent feature and at least one intermediate detent feature;

a guide pin assembly including a guide pin configured to engage the cam plate so as to be movable along the cam path, and a guide pin biasing assembly for urging the guide pin from either a first pin position to a neutral position;

the first biasing assembly and the guide pin assembly operable to move the guide pin in one direction along the cam path so as to sequentially engage the first detent feature, and each of the at least one intermediate detent feature, when the guide pin engages the first detent feature, the guide pin is in the first pin position, the first biasing assembly urges the guide pin against the first detent feature so as to place the first and second component in the first position, and when the guide pin is moved from the first pin position towards the neutral position, the first biasing assembly urges the guide pin against the at least one intermediate detent feature so as to place the first and second component in one of the at least one intermediate position, and first biasing assembly further operable to urge the guide pin to disengage from the cam path so as to move the guide pin to the neutral position and place the first and second component in the second position.

2. The multi-position rotary detent assembly as set forth in claim 1, wherein the first detent feature is disposed lower than each of the at least one intermediate detent features, and each of the at least one intermediate detent features are sequentially arranged along the cam path rib and each of the at least one intermediate detent features is positioned relatively higher than a previous at least one intermediate detent feature so as to give the cam path rib a generally ramp shape.

3. The multi-position rotary detent assembly as set forth in claim 1, wherein the cam plate further includes a guide rib adjacent the first detent feature, the guide rib defining a first path of travel leading towards the first detent feature, the guide rib, the first biasing assembly and the guide pin assembly working in concert so as to guide the guide pin along the first path of travel and into the first detent feature.

4. The multi-position rotary detent assembly as set forth in claim 1, wherein the cam plate further includes a bypass rib adjacent the at least one intermediate detent features, the bypass rib defining a second path of travel over each of the at least one intermediate detent features, the bypass rib, the first biasing assembly, and the guide pin assembly working in concert to bypass each of the at least one intermediate detent features, wherein when the first component is moved relative to the second component in a predetermined manner the first biasing assembly and guide pin assembly urges the guide pin along the second path of travel defined by the bypass rib to a predetermined location along the bypass rib whereupon the guide pin is disengaged from the cam plate.

5. The multi-position rotary detent assembly as set forth in claim 1, wherein one of the first and second components is a door and the other of the first and second components is a door frame.

6. The multi-position rotary detent assembly as set forth in claim 1, wherein the first biasing assembly is a torsion spring urging a door away from a door frame.

7. The multi-position rotary detent assembly as set forth in claim 1, wherein the guide pin assembly includes a housing, and a spring, the housing including a slot for which a portion of the guide pin may extend through, the spring interconnects the guide pin to opposite sides of the housing so as to place the guide pin in a neutral position.

8. A multi-position rotary detent assembly operable to selectively retain a door in an open position, a closed position, and at least one partially open position relative to a door frame, the multi-position rotary detent assembly comprising:

a first biasing assembly for biasing the door between the open position and the closed position;

a cam plate disposed on either the door or the door frame, the cam plate having a cam path rib defining a continuous cam path, a first detent feature and at least one intermediate detent feature;

a guide pin assembly disposed on the other of the door or the door frame, the guide pin assembly including a guide pin configured to engage the cam plate so as to be movable along the cam path, the guide pin biasing assembly urging the guide pin from either a first pin position to a neutral position;

wherein the cam plate further includes a guide rib adjacent the first detent feature, the guide rib defining a path of travel leading towards the first detent feature, the guide rib, the first biasing assembly and the guide pin assembly working in concert so as to guide the guide pin into the first detent feature;

wherein the cam plate further includes a bypass rib adjacent the at least one intermediate detent features, the bypass rib defining a path of travel over each of the at least one intermediate detent features, the bypass rib, the first biasing assembly, and the guide pin assembly working in concert to guide the guide pin past each of the at least one intermediate detent features, wherein when the first component is moved relative to the second component in a predetermined manner the first biasing assembly and guide pin assembly urges the guide pin along the path of travel defined by the bypass rib to a predetermined location whereupon the guide pin is disengaged from the cam plate;

the first biasing assembly and the guide pin assembly operable to move the guide pin in one direction along the continuous cam path so as to sequentially engage the first detent feature, and each of the at least one intermediate detent feature, when the guide pin engages the first detent feature, the guide pin is in the first pin position, the first biasing assembly urges the guide pin against the first detent feature so as to place the door in the closed position, and the guide pin is moved from the first pin position towards the neutral position, the first biasing assembly urges the guide pin against the at least one intermediate detent feature so as to place the door in one of the at least one intermediate positions, and the first biasing assembly operable to urge the guide pin to disengage from the cam plate so as to move the guide pin to the neutral position and place the door the open position.

* * * * *

UNITED STATES PATENT AND TRADEMARK OFFICE
CERTIFICATE OF CORRECTION

| | | |
|---|---|---|
| PATENT NO. | : 8,172,297 B2 | |
| APPLICATION NO. | : 12/244055 | |
| DATED | : May 8, 2012 | |
| INVENTOR(S) | : Que-Whang Rhee | |

It is certified that error appears in the above-identified patent and that said Letters Patent is hereby corrected as shown below:

In the Specification

Col. 6, line 31: replace "can plate" with --cam plate--.

Signed and Sealed this
Third Day of December, 2013

Margaret A. Focarino
*Commissioner for Patents of the United States Patent and Trademark Office*